F. W. TAYLOR.
PNEUMATIC TIRE.
APPLICATION FILED SEPT. 14, 1907.

901,211. Patented Oct. 13, 1908.

Witnesses:
Francis H. Bishop.
Walter L. Pierce.

Inventor:
Frederick W. Taylor
by his attorney, Charles N. Gooding.

UNITED STATES PATENT OFFICE.

FREDERICK W. TAYLOR, OF ASHLAND, VIRGINIA.

PNEUMATIC TIRE.

No. 901,211.      Specification of Letters Patent.      Patented Oct. 13, 1908.

Application filed September 14, 1907. Serial No. 392,873.

*To all whom it may concern:*

Be it known that I, FREDERICK W. TAYLOR, a citizen of the United States, residing at Ashland, in the county of Hanover and State of Virginia, have invented new and useful Improvements in Pneumatic Tires, of which the following is a specification.

This invention relates to improvements in pneumatic tires, and the object is to provide a pneumatic tire which will be puncture proof and will not be subject to blow-outs.

The invention consists in the combination and arrangement of parts set forth in the following specification and particularly pointed out in the appended claims.

Figures 1, 2:
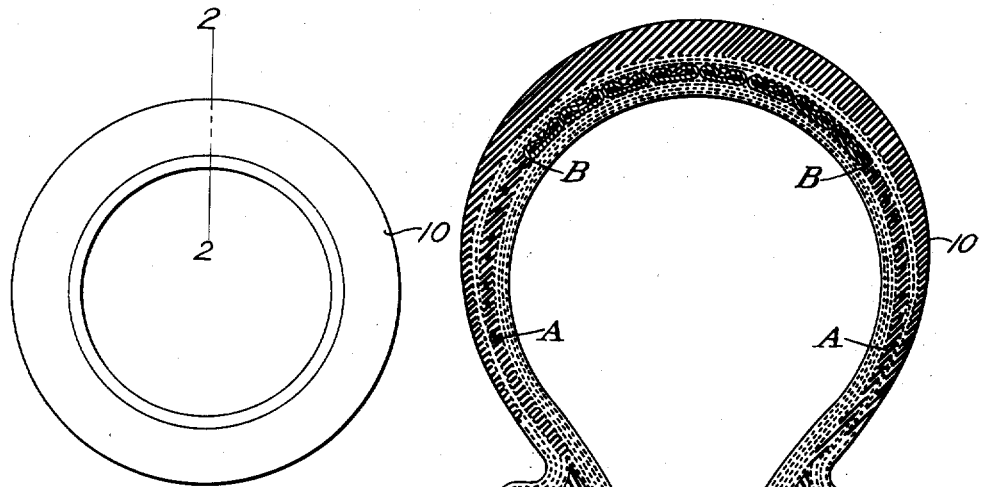
Figure 5:
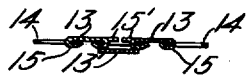
Figure 3:
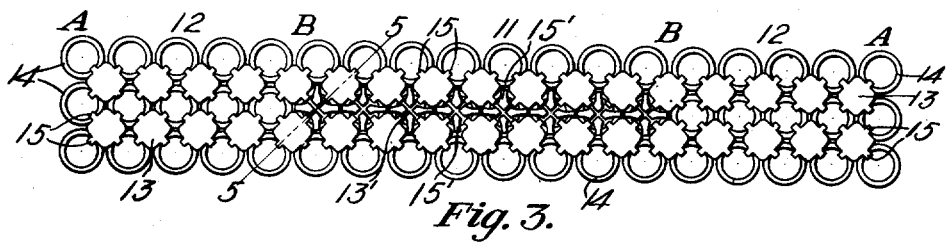
Figure 4:
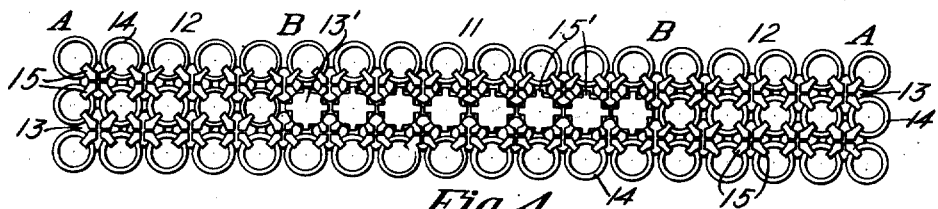

Referring to the drawings: Figure 1 is a side elevation of a tire embodying my invention. Fig. 2 is an enlarged detail section taken on line 2—2 of Fig. 1. Fig. 3 is a detail top plan of the metal fabric. Fig. 4 is a detail bottom plan of the metal fabric. Fig. 5 is a section taken on line 5—5 of Fig. 3.

Like numerals and like letters of reference refer to like parts throughout the several views of the drawings.

In the drawings, 10 is the rubber shoe or outer portion of a pneumatic tire which may be of any usual or desired construction. In the shoe 10 is embedded a sheet of metal fabric which preferably consists of an impenetrable portion 11 extending from B to B which is in the tread portion of the tire and two comparatively penetrable portions 12, 12 each of which extends from A to B located on each side of the impenetrable portion 11.

I will now proceed to describe the preferred construction of the comparatively penetrable portions 12.

A series of plates 13 and rings 14 are connected together in such a manner as to constitute what may be termed a repeating pattern, each of the plates 13 being provided with four hooks 15 each of which interlocks with a ring 14, that is, each of said hooks is bent around and over its respective ring 14 in such a manner as to permanently unite the plates 13 and rings 14 and yet loosely enough so that the fabric which is made up of said rings and plates is perfectly flexible.

I will now proceed to describe the impenetrable portion 11.

The impenetrable portion 11 is the same as the penetrable portions 12 with the addition of a second series of plates 13′ which are identical with the plates 13, but are arranged on the opposite side of the fabric and each of the plates 13′ is provided with four hooks 15′ each of which interlocks with or in other words is clenched around one of the rings 14, the hooks 15′ being located between the hooks 15. The portion 11 although impenetrable, is very flexible and will conform to all movements of the tire.

When the tire is not in use, the impenetrable portion 11 protects the tread portion of the tire from being punctured and the comparatively penetrable portions 12 strengthen the sides of the tire and prevent blow-outs.

While I have shown each of the plates provided with four hooks connected, respectively, to four rings, I may, if I desire, use any other suitable number and I do not limit myself to this particular number.

Having thus described my invention, what I claim and desire by Letters Patent to secure is:

1. A protective fabric for pneumatic tires, comprising a plurality of plates each provided with a hook, a ring interlocking with said hooks, and another plate provided with a plurality of hooks interlocking with said ring between said first-named hooks.

2. A protective fabric for pneumatic tires, comprising a plurality of plates, a ring pivotally connected to said plates, and another plate extending across the space surrounded by said ring and pivotally connected to said ring between the points of connection of said first plates with said ring.

In testimony whereof I have hereunto set my hand in presence of two subscribing witnesses.

FREDERICK W. TAYLOR.

Witnesses:
     JOSEPHINE TAYLOR,
     IRA TAYLOR.